(12) United States Patent
Prakash et al.

(10) Patent No.: US 11,653,680 B2
(45) Date of Patent: May 23, 2023

(54) SIAMENOSIDE I SWEETENED COMPOSITIONS AND USES OF THE SAME

(71) Applicant: The Coca-Cola Company, Atlanta, GA (US)

(72) Inventors: Indra Prakash, Alpharetta, GA (US); Gil Ma, Atlanta, GA (US); Xiaoliang Tan, Marietta, GA (US); Gao Zhu, Sandy Springs, GA (US); Ryan D. Woodyer, Dallas, GA (US); Charles Frohman, Atlanta, GA (US); Juvenal Higiro, Acworth, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 16/614,901

(22) PCT Filed: May 18, 2018

(86) PCT No.: PCT/US2018/033352
§ 371 (c)(1),
(2) Date: Nov. 19, 2019

(87) PCT Pub. No.: WO2018/213683
PCT Pub. Date: Nov. 22, 2018

(65) Prior Publication Data
US 2020/0154738 A1    May 21, 2020

Related U.S. Application Data (60) Provisional application No. 62/508,719, filed on May 19, 2017.

(51) Int. Cl.
*A23L 2/60* (2006.01)
*A23L 2/02* (2006.01)

(52) U.S. Cl.
CPC .. *A23L 2/60* (2013.01); *A23L 2/02* (2013.01)

(58) Field of Classification Search
CPC .................................... A23L 2/60; A23L 2/02
See application file for complete search history.

(56) References Cited

U.S. PATENT DOCUMENTS

| | | | |
|---|---|---|---|
| 4,084,010 A * | 4/1978 | Takemoto | C07J 19/00 426/548 |
| 5,433,965 A | 7/1995 | Fischer et al. | |
| 8,679,569 B2 | 3/2014 | Hansen et al. | |
| 9,101,162 B2 | 8/2015 | Markosyan | |
| 9,854,827 B2 | 1/2018 | Woodyer et al. | |
| 2007/0082106 A1 | 4/2007 | Lee et al. | |
| 2008/0226788 A1 | 9/2008 | Chang et al. | |
| 2012/0189739 A1 | 7/2012 | Rathke et al. | |
| 2014/0272068 A1 | 9/2014 | Prakash et al. | |
| 2014/0342043 A1 | 11/2014 | Bell et al. | |
| 2014/0343262 A1 * | 11/2014 | Prakash | A23L 27/36 536/18.1 |
| 2016/0302463 A1 | 10/2016 | Woodyer et al. | |

FOREIGN PATENT DOCUMENTS

| | | | |
|---|---|---|---|
| CN | 102942611 | 2/2013 | |
| EP | 3436151 | 2/2019 | |
| EP | 3614860 | 3/2020 | |
| JP | 2001 211854 | 8/2001 | |
| WO | WO-9418855 A1 * | 9/1994 | .......... A23L 1/2366 |
| WO | 2010/050510 | 5/2010 | |
| WO | WO 2008/112962 | 9/2018 | |

OTHER PUBLICATIONS

European Search Report from EP Patent Application No. 18802891.4, dated Jan. 18, 2021.
International Search Report fromPCT/US2018/033352, dated Aug. 10, 2018.
International Preliminary Report on Patentability from PCT/US2018/033352, dated Jul. 24, 2019.
Siamenoside I, Nov. 2, 2015, Wikipedia, pp. 1-2.

* cited by examiner

*Primary Examiner* — Nikki H. Dees
(74) *Attorney, Agent, or Firm* — King & Spalding (57) ABSTRACT

Sweetener compositions or sweetened compositions (such as beverages or beverage products) containing siamenoside I are provided herein, as well as methods of preparing the same. Methods of improving the flavor and/or temporal profile of sweetenable compositions, such as beverages, are also provided.

11 Claims, 1 Drawing Sheet

SIAMENOSIDE I SWEETENED COMPOSITIONS AND USES OF THE SAME

CROSS REFERENCE TO RELATED APPLICATIONS

This application is a national phase application under 35 U.S.C. § 371 of International Application No. PCT/US2018/033352, filed on May 18, 2018, which claims priority to U.S. Provisional Patent Application No. 62/508,719 filed May 19, 2017. The contents of each of the above-identified applications is hereby fully incorporated herein by reference.

FIELD OF THE INVENTION

The present invention relates to sweetener compositions and sweetened compositions (such as beverages) containing siamenoside I, as well as methods for preparing the same. The present invention also relates to methods of providing a sugar-like flavor and temporal profile to sweetened compositions utilizing siamenoside I.

BACKGROUND OF THE INVENTION

Natural caloric sugars, such as sucrose, fructose and glucose, are utilized to provide a pleasant taste to beverages, foods, pharmaceuticals, and oral hygienic/cosmetic products. Sucrose, in particular, imparts a taste preferred by consumers. Although sucrose provides superior sweetness characteristics, it is caloric.

Products containing low and no-calorie sweeteners have been introduced to satisfy consumer demand. However, sweeteners within this class differ from natural caloric sugars in ways that continue to frustrate consumers. On a taste basis, non-caloric or low caloric sweeteners exhibit a temporal profile, maximal response, flavor profile, mouth feel, and/or adaptation behavior that differ from sugar. Specifically, non-caloric or low caloric sweeteners exhibit delayed sweetness onset, lingering sweet aftertaste, bitter taste, metallic taste, astringent taste, cooling taste and/or licorice-like taste. On a source basis, many non-caloric or low caloric sweeteners are synthetic chemicals. The desire for products sweetened with natural non-caloric or low caloric sweeteners that tastes like sucrose remains high.

Certain compounds identified from natural sources have been suggested as sweeteners, including certain compounds from *Stevia* and monk fruit extracts. However, these compounds are known to have unpredictable taste properties and many are not usable in sweetened products due to unfavorable taste profiles.

There remains a further need to develop products, such as beverages, sweetened with natural reduced or non-caloric sweeteners that provide a temporal and flavor profile similar to that of sucrose.

SUMMARY OF THE INVENTION

Beverages or beverage products comprising siamenoside I are provided herein, as well as methods for making the same. Advantageously, the beverages/beverage products possess a sugar-like flavor and temporal profile.

In one embodiment, the beverage comprises a liquid matrix and siamenoside I as the sole sweetener.

In another embodiment, the beverage comprises a liquid matrix, siamenoside I and at least one additional sweetener, wherein the at least one additional sweetener is not a non-carbohydrate sweetener.

In another embodiment, the beverage comprises a liquid matrix and siamenoside I, wherein the beverage does not contain another mogroside compound. In particular, in certain embodiments the beverage does not contain mogroside V.

In yet another embodiment, the beverage comprises a liquid matrix and siamenoside I, wherein the beverage does not contain another mogroside compound in a sweetenable amount. In particular, in certain embodiments the beverage does not contain mogroside V in a sweetenable amount.

In a further embodiment, the beverage comprises a liquid matrix and between about 100 ppm and about 500 ppm siamenoside I, and more particularly, between about 300 ppm and about 400 ppm siamenoside I.

In a further embodiment, the beverage comprises a liquid matrix and siamenoside I, wherein the siamenoside I is present in an effective amount to provide a sweetness equivalence of at least about 5 degrees Brix of sucrose, more particularly at least about 7 degrees Brix of sucrose, and even more particularly, at least about 10 degrees Brix of sucrose, when present in the beverage.

The source of the siamenoside I may vary. In one embodiment, the siamenoside I is synthesized or bio-synthesized. In another embodiment, the siamenoside I is not extracted from fruit. In another embodiment, the siamenoside I is extracted from fruit.

The purity of the siamenoside I may vary. In one embodiment, the siamenoside I is at least about 80% pure, or more particularly, at least about 90% pure, or more particularly, about 95% pure.

The beverage may vary. In one embodiment, the beverage is an acidic beverage. In a particular embodiment, the beverage has a pH of about 4. In one embodiment, the beverage has a pH of less than about 4.

In one embodiment, the beverage is a carbonated beverage. In a particular embodiment, the beverage is a cola. In another particular embodiment, the beverage is a citrus beverage. In certain other embodiments, the beverage is a still beverage, i.e., non-carbonated.

In another embodiment, the beverage further comprises at least about 500 ppm phosphoric acid. In a further embodiment, the beverage further comprises citric acid in amount less than about 500 ppm.

The caloric content of the beverage may vary. In one embodiment, the beverage is full-calorie, low-calorie or no-calorie.

In one embodiment, the beverage further comprises at least about 10% fruit juice, or more particularly, at least about 40% fruit juice.

The beverage of the present invention has advantageous taste properties. In one embodiment, the beverage has fewer licorice notes than a beverage sweetened with the same amount of Lo Han Guo (LHG) extract or mogroside V.

In another embodiment, the beverage has fewer bitter notes than a beverage sweetened with the same amount of LHG extract or mogroside V.

In a further embodiment, the beverage has a better mouthfeel than a beverage sweetened with the same amount of LHG extract or mogroside V.

In a still further embodiment, the beverage has the same sweetness as a beverage sweetened with at least 250 ppm of Reb M and more particularly, at least 250 ppm of at least 75% Reb M. In certain embodiments, the beverage has the same sweetness as a beverage sweetened with about 290 ppm of Reb M, and more particularly, at least about 290 ppm of at least 80% Reb M. The sweetness may be measured in sucrose equivalence units.

In a particular embodiment, the beverage has the same sweetness as a beverage sweetened with about 250 ppm of Reb M, more particularly 80% Reb M.

The beverage may contain one or more additives, one or more functional ingredients or combinations thereof.

Methods of preparing sweetened beverages are also provided herein. In one embodiment, the method for preparing a sweetened beverage comprises combining a sweetenable beverage and siamenoside I to provide a sweetened beverage, wherein siamenoside I is the only sweetener added to the sweetenable beverage.

In one embodiment, the method for preparing a sweetened beverage comprising combining a sweetenable beverage with siamenoside I to provide a sweetened beverage, wherein siamenoside I is added to the sweetenable beverage to provide an amount of siamenoside I between about 100 ppm to about 500 ppm, or more particularly, between about 300 ppm and about 400 ppm.

In another embodiment, the method for preparing a sweetened beverage comprises combining a sweetenable beverage with siamenoside I to provide a sweetened beverage, wherein the sweetened beverage has a BRIX of at least about 5, or more particularly, at least about 7, or more particularly, at least about 10 or more.

The method may further comprising adding one or more additives and/or functional ingredients to the sweetenable beverage or sweetened beverage.

BRIEF DESCRIPTION OF THE DRAWINGS

The accompanying drawings are included to provide a further understanding of the invention. The drawings illustrate embodiments of the invention and together with the description serve to explain the principles of the embodiments of the invention.

DETAILED DESCRIPTION OF THE INVENTION

The present invention provides sweetener compositions and sweetened compositions comprising siamenoside I, as well as methods of preparing the same. It also extends to methods of providing sweetener compositions and sweetened compositions with a more sugar-like flavor and temporal profile utilizing siamenoside I.

Definitions

Figure 1:
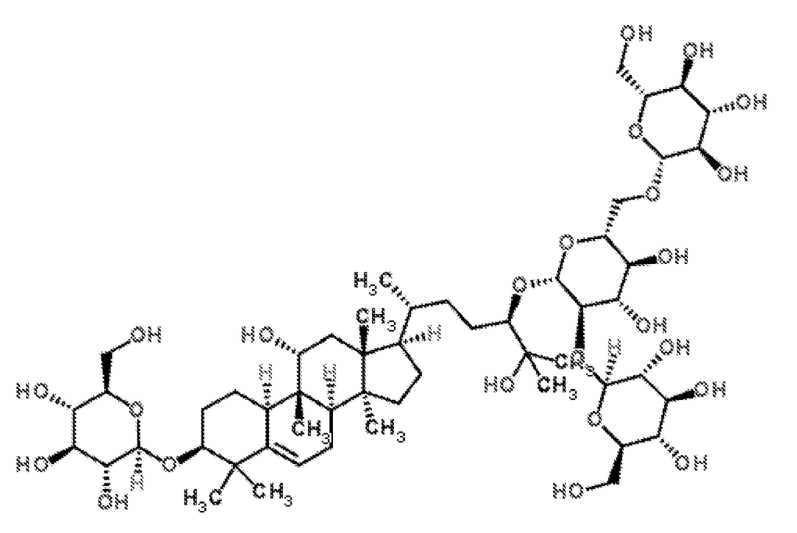
FIG. 1 shows the chemical structure of siamenoside I.

As used herein, the term "siamenoside I" refers to a compound having the chemical structure shown in FIG. 1. It has the chemical formula $C_{54}H_{92}O_{24}$ and a molecular weight of 1125.29. Siamenoside I can be prepared by suitable methods as described herein.

As used herein, the term "mogroside" or "mogroside compound" refers to a chemical compound, and constitutes a glycoside of cucurbitane derivatives. They are found in certain plants, such as the fruit of the gourd vine luo han guo (*Siraitia grosvenorii*). Alternatively, they can be synthesized or bio-synthesized.

As used herein, the term "luo han guo" or "LHG" refers to the fruit of *Siraitia grosvenori*, a member of the Curcubitaceae. The sweetness of the fruit is increased by the mogrosides, a group of triterpene glycosides (saponins). The five different mogrosides are numbered from I to V; the main component is mogroside V (molecular weight 1287.5). Various extraction techniques are used to isolate mogrosides from luo han guo fruits.

As used herein, the term "temporal profile" of a composition means the intensity of sweetness perceived over time in tasting of a composition by a human.

The term "sweetener", as used herein, refers to a consumable product, which produces a sweet taste when consumed alone The term "sweetener compositions", as used herein, mean compositions that contain at least one sweet component in combination with at least one other substance, such as, for example, another sweetener or an additive.

The term "sweetenable compositions", as used herein, mean substances which are contacted with the mouth of man or animal, including substances which are taken into and subsequently ejected from the mouth and substances which are drunk, eaten, swallowed or otherwise ingested, and are safe for human or animal consumption when used in a generally acceptable range. A beverage is an exemplary sweetenable composition.

The term "sweetened compositions", as used herein, mean substances that contain both a sweetenable composition (e.g., a beverage) and a sweetener or sweetener composition. Siamenoside I or a sweetener composition comprising siamenoside I can be added to the sweetenable composition, thereby providing a sweetened composition. A sweetened beverage is a type of sweetened composition. The beverage may be non-sweet before the sweetener or sweetener composition is added, or naturally sweet (e.g., a juice) prior to the addition of the sweetener or sweetener composition.

The term "sweetness intensity," as generally used herein, refers to any perceptible sweetness. For example, a composition of the disclosure may be slightly more sweet than a composition comprising the at least one sweetener without the at least one sweetener taste modulator.

The term "sweetness recognition threshold concentration," as generally used herein, is the lowest known concentration of a sweet compound that is perceivable by the human sense of taste. The sweetness recognition threshold level is specific for a particular compound, and varies based on temperature, matrix, ingredients and/or flavor system. The sweetness recognition threshold concentrations measurements and 5% sucrose equivalence measurements described herein were determined in water at room temperature.

As used herein, the term "less than" assumes a value greater than zero.

The term ""licorice," as generally used herein, refers to a sweet, semi-sweet, bitter, and/or aromatic taste of a sweetener or sweetened composition.

As used herein, the term "sole sweetener" with reference to a sweetener composition means that all other compounds are present in the final sweetener composition at a concentration below their sweetness threshold. In certain embodiments, no additional compounds that are known at any threshold to be a sweetening food additive are included in the sweetener composition. In other embodiments, compounds that are known to be sweetening food additives can be included in the sweeter composition at a level below the threshold. The threshold measures the lowest concentration of a compound that is perceived to be sweet.

As used herein the term "sole sweetener" with reference to a sweetened composition means that only one sweetener has been added to the sweetened composition. The sweetened composition may be non-sweet before addition of the one sweetener, or may be naturally sweet prior to the addition of the one sweetener (e.g., juice).

The term "bitter" or "bitter taste" as used herein refers to the perception or gustatory sensation resulting following the detection of a bitter tastant. The following attributes may contribute to bitter taste: astringent, bitter-astringent, metallic, bitter-metallic, as well as off-tastes, aftertastes and undesirable tastes including but not limited to freezer-burn and card-board taste, and/or any combinations of these. It is noted that, in the art, the term "off-taste" is often synonymous with "bitter taste."

The term "mouthfeel" involves the physical and chemical interaction of a consumable in the mouth. Herein, specifically, the term "mouthfeel" refers to the fullness sensation experienced in the mouth, which relates to the body and texture of the consumable such as its viscosity.

The term "mogroside", as used herein, refers to a triterpene-glycoside and is recognized in the art and is intended to include the major and minor constituents of mogroside extracts. Mogrosides are found in certain plants, such as the fruit of luo han guo.

The term "ppm", as used herein, means parts-per-million and is a weight relative parameter. A part-per-million is a microgram per gram, such that a component that is present at 10 ppm is present at 10 micrograms of the specific component per 1 gram of the aggregate mixture.

The term "high potency sweetener" means a synthetic or artificial high potency sweetener and a natural high-potency sweetener.

The terms "natural high-potency sweetener," "NHPS," "NHPS composition." and "natural high-potency sweetener composition" are used interchangeably, herein, and refer to any sweetener found in nature which may be in raw, extracted, purified, or any other form, singularly or in combination thereof and characteristically have a sweetness potency greater than sucrose, fructose, or glucose, yet have fewer or no calories.

The term "flavor profile" or "taste profile," as generally used herein, refers to the intensity of various flavor/taste attributes of a sweetener or sweetened composition. Exemplary flavor/taste attributes are sweetness intensity, bitterness intensity, salty intensity, licorice intensity, cooling intensity, and licorice intensity. Methods of determining the flavor profile of a given sweetener or sweetened composition are known in the art. The term "temporal profile," as generally used herein, refers to the detected sucrose equivalence a given sweetener or sweetened composition elicits over time. The temporal profile of most sweeteners is neither constant nor similar. Initially, the detected sucrose equivalence spikes to the maximal response level, then tapers off over time. The longer the taper, the greater the detected sweetness linger (i.e. aftertaste) of a compound or sweetened composition.

Siamenoside I

Siamenoside I is a mogroside, initially isolated from *Siraitia siamensis* (Kasai, R. et al., *Agric. Biol. Chem.* 1989, 53, 3347-3349) and later, from *Siraitia grosvenorii* (Luo han guo) (Matsumoto, K. et al, *Chem. Pharm. Bull.* 1990, 38, 2030-2032).

Four major compounds, Mogroside V, Mogroside IV, Siamenoside I, and 11-Oxomogroside V, have been identified from the fruits of *Siraitia grosvenorii* that are responsible for the sweetness of the fruits. Mogroside V is the most abundant of these four compounds at approximately 0.57% (w/w) of the dry fruit, followed by Mogroside IV and Siamenoside I, each of which contain four glucose moieties. 11-Oxomogroside V has a ketone group instead of a hydroxyl at C-11. See, e.g., Takemoto, et al., *Yakugaku Zasshi*, 103, 1151-1154; 1155-1166; 1167-1173, (1983); Kasai, et al., *Agric. Biol. Chem.* 53, 3347-3349 (1989); Matsumoto, *Chem. Pharm. Bull.* 38, 2030-2032 (1990); and Prakash, et al., *J. Carbohydrate Chem.* 30, 16-26 (2011).

Siamenoside I for use in the present invention can be prepared by any suitable means, including but not limited to synthesis, biosynthesis or extraction.

Methods for synthesis of mogrosides including siamenoside are known in the art. As one example, U.S. Patent Publication No. US 2014/0308698, which is incorporated herein by reference, describes methods for enzymatic synthesis of mogrosides, including siamenoside I.

In other embodiments, the siamenoide I is extracted from fruit.

Various extraction techniques are used to isolate mogrosides from luo han guo fruits. As a result luo han guo powdered extracts are being prepared which usually contain 30-65% w/w of total mogrosides, and mogroside V content of those materials can vary as much as 18-55%. Methods of preparing highly purified mogrosides mixture from low purity mogrosides mixtures are known in the art. U.S. Pat. No. 9,101,162, which is incorporated herein by reference, provides one example.

In certain embodiments, the siamenoside I is not extracted from fruit.

Sweetener Compositions

Siamenoside I may be provided in a purified form or as a component of a mixture containing siamenoside I and one or more additional components, wherein the mixture is suitable for use in sweetening a sweetenable composition, i.e., a sweetener composition.

In one embodiment, siamenoside I is provided as a component of a mixture. In a particular embodiment, the mixture is a LHG extract. In certain other embodiments, the siamenoside is derived from enzymatic conversion of an alternate starting material, such as for example through fermentation using a bioreactor. In certain other embodiments the siamenoside is derived from enzymatic or microbial conversion of LHG extract.

The composition may contain siamenoside I in an amount that ranges from about 5% to about 99% by weight on a dry basis, such as, for example, from about 10% to about 99%, from about 20% to about 99%, from about 30% to about 99%, from about 40% to about 99%, from about 50% to about 99%, from about 60% to about 99%, from about 70% to about 99%, from about 80% to about 99% and from about 90% to about 99%. In still further embodiments, the composition contains siamenoside I in an amount greater than about 80%, greater than about 90%, or greater than about 95% by weight on a dry basis, for example, greater than about 91%, greater than about 92%, greater than about 93%, greater than about 94%, greater than about 95%, greater than about 96%, greater than about 97%, greater than about 98% and greater than about 99%.

In one embodiment, siamenoside I is provided in the absence of other mogrosides, including but not limited to mogroside V. In another embodiment, siamenoside I is provided in the absence of other mogrosides in a sweetening amount.

In one embodiment, siamenoside I is the sole sweetener in the sweetener composition, i.e. siamenoside I is the only compound present in the sweetener composition that provides detectable sweetness. In a specific embodiment, the siamenoside is present in a sweetener composition in which no other mogrosides are present or present in sweetening amounts. In further embodiments, the siamenoside is present in a sweetener composition which does not include a rare sugar or a rare sugar in sweetening amounts.

In certain embodiments, the siamenoside I is present in a sweetener composition which does not include a sugar alcohol or a sugar alcohol in sweetening amounts. In certain embodiments, the siamenoside is present in a sweetener composition which does not include allulose or allulose in a sweetening amount. In other embodiments, the siamenoside is present in a sweetener composition which does not include erythritol or erythritol in a sweetening amount.

In another embodiment, siamenoside I is one of two or more sweetener compounds present in the sweetener composition. The one or more additional sweetener can be any type of sweetener, for example, a natural, non-natural, or synthetic sweetener. In one embodiment, the additional sweetener is not a non-carbohydrate sweetener.

In certain embodiments, the additional sweeteners may be a carbohydrate sweetener. Non-limiting examples of suitable carbohydrate sweeteners include sucrose, fructose, glucose, erythritol, maltitol, lactitol, sorbitol, mannitol, xylitol, tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, fuculose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, ketotriose (dehydroxyacetone), aldotriose (glyceraldehyde), nigero-oligosaccharides, fructooligosaccharides (kestose, nystose and the like), maltotetraose, maltotriol, tetrasaccharides, mannan-oligosaccharides, malto-oligosaccharides (maltotriose, maltotetraose, maltopentaose, maltohexaose, maltoheptaose and the like), dextrins, lactulose, melibiose, raffinose, rhamnose, ribose, isomerized liquid sugars such as high fructose corn/starch syrup (HFCS/HFSS) (e.g., HFCS55, HFCS42, or HFCS90), coupling sugars, soybean oligosaccharides, glucose syrup and combinations thereof. D- or L-configurations can be used when applicable. In other embodiments, the additional sweetener is a carbohydrate sweetener selected from the group consisting of glucose, fructose, sucrose and combinations thereof. In another embodiment, the additional sweetener is a carbohydrate sweetener selected from D-allose, D-psicose, L-ribose, D-tagatose, L-glucose, L-fucose, L-Arbinose, Turanose and combinations thereof.

In one embodiment, siamenoside I and the carbohydrate sweetener may be present in the sweetener composition in any weight ratio, such as, for example, from about 0.001:14 to about 1:0.01, such as, for example, about 0.06:6. In another embodiment, carbohydrates are present in the sweetener composition in an amount effective to provide a concentration from about 100 ppm to about 140,000 ppm when present in a sweetened composition, such as, for example, a beverage. In a particular embodiment, the carbohydrate sweetener is present in the sweetener composition in an amount effect to provide a concentration from about 100 ppm to about 1000 ppm, from about 500 ppm to about 2000 ppm, from about 1000 ppm to about 10,000 ppm, from about 5,000 ppm to about 15,000 ppm, from about 10,000 ppm to about 20,000 ppm, from about 20,000 ppm to about 40,000 ppm, from about 40,000 ppm to about 60,000 ppm, from about 60,000 ppm to about 80,000 ppm, from about 80,000 ppm to about 100,000 ppm, from about 100,000 ppm to about 120,000 ppm, from about 120.00 ppm to about 140,000 pm when present in a sweetened composition, such as, for example, a beverage. In yet another particular embodiment, the carbohydrate sweetener is present in the sweetener composition in an amount effect to provide a concentration of greater than about 100 ppm, greater than about 250 ppm, greater than about 500 ppm, greater than about 750 ppm, greater than about 1000 ppm, greater than about 2500 ppm, greater than about 5000 ppm, greater than about 10,000 ppm, greater than about 25,000 ppm, greater than about 50,000 ppm, greater than about 100,000 ppm, or greater than about 125,000 when present in a sweetened composition, such as, for example, a beverage.

In yet other embodiments, the at least one additional sweetener is not directly derived from a natural extraction. Such a sweetener characteristically has a sweetness potency greater than sucrose, fructose, or glucose, yet has less calories. Non-limiting examples of such sweeteners suitable for embodiments of this disclosure include sucralose, potassium acesulfame, acesulfame acid and salts thereof, aspartame, alitame, saccharin and salts thereof, neohesperidin dihydrochalcone, cyclamate, cyclamic acid and salts thereof, neotame, advantame, glucosylated steviol glycosides (GSGs) and combinations thereof. The at least one sweetener not directly derived from natural extraction is present in the sweetener composition in an amount effective to provide a concentration from about 0.3 ppm to about 3,500 ppm when present in a sweetened composition, such as, for example, a beverage. In one embodiment, the at least one sweetener not directly derived from natural extraction is present in the sweetener composition in an amount effective to provide a concentration from about 0.5 ppm to about 3,000 ppm, from about 1.0 ppm to about 2,500 ppm, from about 5.0 ppm to about 2,000 ppm, from about 10 ppm to about 1,500 ppm, from about 50 ppm to about 1000 ppm, from about 100 ppm to about 800 ppm, or from about 400 ppm to about 600 ppm when present in a sweetened beverage. In another embodiment, the at least one embodiment, the at least one sweetener not directly derived from natural extraction is present in the sweetener composition in an amount effective to provide a concentration greater than about 0.3 ppm, greater than about 0.5 ppm, greater than about 1.0 ppm, greater than about 5.0 ppm, greater than about 10 ppm, greater than about 20 ppm, greater than about 50 ppm, greater than about 100 ppm, greater than about 250 ppm, greater than about 500 ppm or greater than about 1000 ppm when present in a sweetened composition, such as, for example, a beverage.

In still other embodiments, the additional sweetener can be a natural high potency sweetener. Suitable natural high potency sweeteners include, but are not limited to, rebaudioside A, rebaudioside B, rebaudioside C, rebaudioside D, rebaudioside E, rebaudioside F, rebaudioside I, rebaudioside H, rebaudioside L, rebaudioside K, rebaudioside J, rebaudioside M, rebaudioside N, rebaudioside O, dulcoside A, dulcoside B, rubusoside, *Stevia*, stevioside, mogroside IV, mogroside V, Luo Han Guo, miraculin, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, steviolbioside and cyclocarioside I. The natural high potency sweetener can be provided as a pure compound or, alternatively, as part of an extract. For example, rebaudioside A can be provided as a sole compound or as part of a *Stevia* extract. The natural high potency sweetener is present in the sweetener composition in an amount effective to provide a concentration from about 0.1 ppm to about 3,000 ppm when present in a sweetened composition, such as, for example, a beverage. In one embodiment, the natural high potency sweetener is present in the sweetener composition in an amount effective to provide a concentration from about 0.5 ppm to about 2500 ppm, from about 1.0 ppm to about 2000 ppm, from about 5 ppm to about 1500 ppm, from about 10 ppm to about 1000 ppm, or about 25 ppm to about 500 ppm when present in a sweetened composition, such as, for example, a beverage. In one embodiment, the natural high potency sweetener is present in the sweetener composition in an amount effective to provide a concentration of greater than about 0.1 ppm, about 0.5 ppm, about 1.0 ppm, about 2.5 ppm, about 5.0 ppm, about 10 ppm, about 20 ppm, about 25 ppm, about 50 ppm, about 75 ppm, about 100 ppm, about 200 ppm, about 500 ppm, about 1000 ppm, about 2000 ppm, or about 300 ppm when present in a sweetened composition, such as, for example, a beverage.

In one embodiment, the siamenoside I and the natural high potency sweetener may be present in the sweetener composition in any weight ratio, such as, for example, from about 0.1:10, about 0.5:5, or about 1:3. In another embodiment, the siamenoside I and the natural high potency sweetener may be present in the sweetener composition in a weight ratio of about 1:1, about 1:2, about 1:3, about 1:4, or about 1:5.

In still other embodiments, the additional sweetener can be chemically or enzymatically modified natural high potency sweetener. Modified natural high potency sweeteners include glycosylated natural high potency sweetener such as glucosyl-, galactosyl-, fructosyl-derivatives containing 1-50 glycosidic residues. Glycosylated natural high potency sweeteners may be prepared by enzymatic transglycosylation reaction catalyzed by various enzymes possessing transglycosylating activity.

When the sweetener composition contains more than one sweetener, the sweeteners may exhibit synergy when combined and have improved flavor and temporal profiles compared to each sweetener alone. The term "synergistic" or "synergistic effect" refers to an effect (e.g., flavor, temporal profile) achieved with the combination of two or more sweeteners which is greater than the sum of the effects that effect from using the particular sweeteners alone or separately. Advantageously, such synergy between the two or more sweeteners allows for the use of smaller doses of one or both sweeteners or provides greater effect at the same amounts. The amount or degree of synergism may vary.

The amount of sucrose in a reference solution may be described in degrees Brix (° Bx). One degree Brix is 1 gram of sucrose in 100 grams of solution and represents the strength of the solution as percentage by weight (% w/v) (strictly speaking, by mass). In one embodiment, a sweetener composition contains siamenoside I in an amount effective to provide sweetness equivalent from of at least about 5 degrees Brix of sugar when present in a sweetened composition (e.g., a beverage), such as, for example, from at least about 5, at least about 6, at least about 7, at least about 8, at least about 9, at least about 10, at least about 11, at least about 12, at least about 13, at least about 14 or at least about 15 or more degrees Brix. In another embodiment, the sweetener composition contains siamenoside I in an amount effective to provide sweetness equivalent from of about 5 degrees Brix of sugar when present in a sweetened composition (e.g., a beverage), such as, for example, about 5, about 6, about 7, about 8, about 9, about 10, about 11, about 12, about 13, about 14, about 15 or more degrees Brix.

In a particular embodiment, the sweetener composition contains siamenoside I in an amount effective to provide sweetness equivalent from of between about 3 and about 15 degrees Brix of sugar when present in a sweetened composition (e.g., a beverage), such as, for example, between about 4 and about 14 degrees Brix, between about 5 and about 13 degrees Brix, between about 6 and about 12 degrees Brix, between about 7 and about 11 degrees Brix or between about 8 and about 10 degrees Brix.

The sweetness of a non-sucrose sweetener can also be measured against a sucrose reference by determining the non-sucrose sweetener's sucrose equivalence. Typically, taste panelists are trained to detect sweetness of reference sucrose solutions containing between 1-15% sucrose (w/v). Other non-sucrose sweeteners are then tasted at a series of dilutions to determine the concentration of the non-sucrose sweetener that is as sweet as a given percent sucrose reference. For example, if a 1% solution of a sweetener is as sweet as a 10% sucrose solution, then the sweetener is said to be 10 times as potent as sucrose.

In one embodiment, siamenoside I is present in an effective amount to provide a sucrose equivalence of greater than about 10% (w/v) when present in a sweetened composition, such as, for example, greater than about 11%, greater than about 12%, greater than about 13% or greater than about 14%. In one embodiment, siamenoside I is present in an effective amount to provide a sucrose equivalence of greater than about 10% (w/v) when present in a beverage or beverage product, such as, for example, greater than about 11%, greater than about 12%, greater than about 13% or greater than about 14%.

The amount of siamenoside I in the sweetener composition may vary. In one embodiment, siamenoside I is present in a sweetener composition in any amount to impart the desired sweetness when the sweetener composition is present in a sweetened composition (e.g., beverage). For example, siamenoside I is present in the sweetener composition in an amount effective to provide a siamenoside I concentration from about 1 ppm to about 10,000 ppm when present in a sweetened composition (e.g., beverage), such as, for example, from about 1 ppm to about 4,000 ppm, from about 1 ppm to about 3,000 ppm, from about 1 ppm to about 2,000 ppm, from about 1 ppm to about 1,000 ppm.

In a particular embodiment, siamenoside I is present in the sweetener composition in an amount effective to provide a siamenoside I concentration from about 100 ppm to about 700 ppm when the sweetener composition is added to the sweetenable composition (e.g., beverage), and more particularly between about 100 ppm and about 500 ppm, and even more particularly, about 100 ppm, about 150 ppm, about 200 ppm, about 250 ppm, about 300 ppm, about 350 ppm, about 400 ppm, about 450 ppm, about 500 ppm, about 550 ppm, about 600 ppm, about 650 ppm or about 700 ppm or more.

In one embodiment, siamenoside I is present in the sweetener composition in an amount effective to provide a siamenoside I concentration of between about 300 ppm and about 400 ppm when the sweetener composition is added to the sweetenable compositions, or even more particularly, about 300 ppm, about 320 ppm, about 340 ppm, about 360 ppm, about 380 ppm or about 400 ppm.

In an exemplary embodiment, siamenoside I is present in the sweetener composition in an amount effective to provide a siamenoside I concentration of about 325 ppm, about 350 ppm, or about 375 ppm when the sweetener composition is added to a sweetenable composition (e.g., a beverage).

The sweetener compositions can be customized to provide the desired calorie content. For example, sweetener compositions can be "full-calorie", such that they impart the desired sweetness when added to a sweetenable composition (such as, for example, a beverage) and have about 120 calories per 8 oz. serving. Alternatively, sweetener compositions can be "mid-calorie", such that they impart the desired sweetness when added to a sweetenable composition (such as, for example, as beverage) and have less than about 60 calories per 8 oz. serving. In other embodiments, sweetener compositions can be "low-calorie", such that they impart the desired sweetness when added to a sweetenable composition (such as, for example, as beverage) and have less than 40 calories per 8 oz. serving. In still other embodiments, the sweetener compositions can be "zero-calorie", such that they impart the desired sweetness when added to a sweetenable composition (such as, for example, a beverage) and have less than 5 calories per 8 oz. serving.

In addition to siamenoside I and, optionally, other sweeteners, the sweetener compositions can optionally include one or more additional additives. In some embodiments, the sweetener composition contains additives including, but not limited to, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, bitter compounds, flavorants and flavoring ingredients, astringent compounds, proteins or protein hydrolysates, surfactants, emulsifiers, weighing agents, gums, antioxidants, colorants, flavonoids, alcohols, polymers and combinations thereof. In some embodiments, the additives act to improve the temporal and flavor profile of the sweetener to provide a sweetener composition with a taste similar to sucrose.

Sweetened Compositions

Siamenoside I or sweetener compositions comprising siamenoside I can be incorporated in any known edible material (referred to herein as a "sweetenable composition"), such as, for example, pharmaceutical compositions, edible gel mixes and compositions, dental compositions, foodstuffs (confections, condiments, chewing gum, cereal compositions baked goods dairy products, and tabletop sweetener compositions) beverages and beverage products.

The sweetened compositions disclosed here include beverages, i.e., ready to drink liquid formulations, beverage concentrates and the like. In certain embodiments, beverage concentrates are prepared with an initial volume of liquid (e.g., water) to which the additional ingredients are added. Full strength beverage compositions can be formed from the beverage concentrate by adding further volumes of liquid (e.g., water) to the concentrate.

In one embodiment, the sweetened composition comprises a sweetenable composition (e.g., a sweetenable beverage) and siamenoside I. In another embodiment, the sweetened composition comprises a sweetener composition comprising siamenoside I. In certain embodiments, the compositions can optionally include additives, sweeteners, functional ingredients and combinations thereof. In one embodiment, the sweetened composition comprises a sweetenable composition and siamenoside I as the sole sweetener. In another embodiment, siamenoside I is provided as part of a mixture. In certain embodiments, the siamenoside I is not derived from a monk fruit extract. In certain embodiments, siamenoside I is effective to provide at least 20% or at least 30% or at least 40% or at least 50% or at least 60% or at least 70% of the perceived sweetness in the composition.

In another embodiment, siamenoside I is present in the sweetened composition in an amount from about 100 ppm and 700 ppm siamenoside I, or more particularly, about 100 ppm and about 500 ppm, and even more particularly, about 100 ppm, about 150 ppm, about 200 ppm, about 250 ppm, about 300 ppm, about 350 ppm, about 400 ppm, about 450 ppm, about 500 ppm, about 550 ppm, about 600 ppm, about 650 ppm or about 700 ppm or more.

In one embodiment, siamenoside I is present in the sweetened composition in an amount from about 300 ppm to about 400 ppm, and more particularly, about 300 ppm, about 320 ppm, about 340 ppm, about 360 ppm, about 380 ppm or about 400 ppm or more.

In another embodiment, siamenoside I is present in the sweetened composition in an amount of about 325 ppm, about 350 ppm or about 375 ppm.

Any of the sweeteners, additives and functional ingredients described herein can be used in the sweetened compositions of the present invention. In a particular embodiment, the sweetenable composition is a beverage.

Beverage and Beverage Products

In one embodiment, the sweetened composition is a beverage or beverage product. "Beverage product", as used herein, is a ready-to-drink beverage, a beverage concentrate, a beverage syrup, or a powdered beverage. Suitable ready-to-drink beverages include carbonated and non-carbonated beverages. Carbonated beverages include, but are not limited to, frozen carbonated beverages, enhanced sparkling beverages, cola, fruit-flavored sparkling beverages (e.g. lemon-lime, orange, grape, strawberry and pineapple), ginger-ale, soft drinks and root beer. Non-carbonated beverages include, but are not limited to, fruit juice, fruit-flavored juice, juice drinks, nectars, vegetable juice, vegetable-flavored juice, sports drinks, energy drinks, enhanced water drinks, enhanced water with vitamins, near water drinks (e.g., water with natural or synthetic flavorants), coconut water, tea type drinks (e.g. black tea, green tea, red tea, oolong tea), coffee, cocoa drink, beverage containing milk components (e.g. milk beverages, coffee containing milk components, café au lait, milk tea, fruit milk beverages), beverages containing cereal extracts and smoothies.

In certain embodiments, the beverage is a juice beverage that has been modified to remove at least some sucrose. In certain embodiments, such juice may be modified to remove at least 10%, at least 20%, at least 30%, at least 40%, at least 50% or more of the sucrose in the non-modified juice. In certain embodiments, the modification occurs through filtration of such juice to remove sucrose. In certain embodiments, sucrose in the juice is broken down to fructose and glucose, prior to adding the sweetening composition described herein.

Beverage concentrates and beverage syrups are prepared with an initial volume of liquid matrix (e.g. water) and the desired beverage ingredients. Full strength beverages are then prepared by adding further volumes of water. Powdered beverages are prepared by dry-mixing all of the beverage ingredients in the absence of a liquid matrix. Full strength beverages are then prepared by adding the full volume of water.

Beverages comprise a matrix, i.e. the basic ingredient in which the ingredients—including the compositions of the present invention—are dissolved. In one embodiment, a beverage comprises water of beverage quality as the matrix, such as, for example deionized water, distilled water, reverse osmosis water, carbon-treated water, purified water, demineralized water and combinations thereof, can be used. Additional suitable matrices include, but are not limited to phosphoric acid, phosphate buffer, citric acid, citrate buffer and carbon-treated water.

The beverage or beverage product can further include at least one additional sweetener. Any of the sweeteners detailed herein can be used, including natural, non-natural, or synthetic sweeteners.

In one embodiment, the beverage or beverage products comprises a rare sugar—either as part of the sweetener component or added to the beverage separately. Suitable rare sugars include, but are not limited to, allulose, sorbose, lyxose, ribulose, xylose, xylulose, D-allose, L-ribose, D-tagatose, L-glucose, L-fucose, L-arabinose, turanose and combinations thereof. The rare sugars can be present in beverage in an amount from about 0.5% to about 3.0%, such as, for example, about 0.5% to about 2.5%, about 0.5% to about 2.0%, about 0.5% to about 1.5%, about 0.5% to about 1.0%, about 1.0% to about 3.0%, about 1.0% to about 2.5%, about 1.0% to about 2.0%, about 1.0% to about 1.5%, about 2.0% to about 3.0% and about 2.0% to about 2.5%. In a particular embodiment, the rare sugar is allulose.

The beverage or beverage product can contain additives including, but not limited to, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, bitter compounds, caffeine, flavorants and flavoring ingredients, astringent compounds, proteins or protein hydrolysates, surfactants, emulsifiers, weighing agents, juice, dairy, cereal and other plant extracts, flavonoids, alcohols, polymers and combinations thereof. Any suitable additive described herein can be used.

The beverage or beverage product can contain one or more functional ingredients, detailed above. Functional ingredients include, but are not limited to, vitamins, minerals, antioxidants, preservatives, glucosamine, polyphenols and combinations thereof. Any suitable functional ingredient described herein can be used.

It is contemplated that the pH of the sweetened composition. Such as, for example, a beverage, does not materially or adversely affect the taste of the sweetener. A non-limiting example of the pH range of the beverage may be from about 1.8 to about 10. In one embodiment, the pH of the beverage is about 4. In another embodiment, the pH of the beverage is less than about 4. In a particular embodiment, the pH of the beverage is less than about 3.8, less than about 3.6, less than about 3.4, less than about 3.2, less than about 3.0, less than about 2.8, less than about 2.6, less than about 2.4 or less than about 2.2. In another embodiment, the pH of the beverage is about 3.8, about 3.6, about 3.4, about 3.2, about 3.0, about 2.8, about 2.6, about 2.4 or about 2.2 or less.

The titratable acidity of a beverage may, for example, range from about 0.01 to about 1.0% by weight of beverage.

In one embodiment, the sparkling beverage product has an acidity from about 0.01 to about 1.0% by weight of the beverage, such as, for example, from about 0.05% to about 0.25% by weight of beverage.

The carbonation of a sparkling beverage product has 0 to about 2% (w/w) of carbon dioxide or its equivalent, for example, from about 0.1 to about 1.0% (w/w).

The beverage can be caffeinated or non-caffeinated.

The temperature of a beverage may, for example, range from about 4° C. to about 100° C., such as, for example, from about 4° C. to about 25° C.

The caloric content of the beverage may vary. The beverage can be a full-calorie beverage that has up to about 120 calories per 8 oz. serving. The beverage can be a mid-calorie beverage that has up to about 60 calories per 8 oz. serving. The beverage can be a low-calorie beverage that has up to about 40 calories per 8 oz. serving. The beverage can be a zero-calorie that has less than about 5 calories per 8 oz. serving.

In a particular embodiment, the sweetened composition is a cola beverage. In one embodiment, the cola beverage further comprises caffeine. The cola beverage can be a low-, mid- or zero-calorie beverage.

In a particular embodiment, the sweetened composition is a citrus beverage.

In some embodiments, the cola beverage further comprises allulose and/or erythritol.

The beverage can optionally include additives, functional ingredients and combinations thereof, as described herein. Any of the additives and/or functional ingredients described above can be present in the consumable.

The beverage or beverage product may further comprise one or more other additives. In some embodiments, the beverage or beverage product contains additives including, but not limited to, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, bitter compounds, flavorants and flavoring ingredients, astringent compounds, proteins or protein hydrolysates, surfactants, emulsifiers, weighing agents, gums, antioxidants, colorants, flavonoids, alcohols, polymers and combinations thereof. In some embodiments, the additives act to improve the temporal and flavor profile to provide a taste similar to sucrose.

In one embodiment, the consumable further comprises one or more polyols. The term "polyol", as used herein, refers to a molecule that contains more than one hydroxyl group. A polyol may be a diol, triol, or a tetraol which contains 2, 3, and 4 hydroxyl groups respectively. A polyol also may contain more than 4 hydroxyl groups, such as a pentaol, hexaol, heptaol, or the like, which contain 5, 6, or 7 hydroxyl groups, respectively. Additionally, a polyol also may be a sugar alcohol, polyhydric alcohol, or polyalcohol which is a reduced form of carbohydrate, wherein the carbonyl group (aldehyde or ketone, reducing sugar) has been reduced to a primary or secondary hydroxyl group.

Non-limiting examples of polyols in some embodiments include maltitol, mannitol, sorbitol, lactitol, xylitol, isomalt, propylene glycol, glycerol (glycerin), threitol, galactitol, palatinose, reduced isomalto-oligosaccharides, reduced xylo-oligosaccharides, reduced gentio-oligosaccharides, reduced maltose syrup, reduced glucose syrup, and sugar alcohols or any other carbohydrates capable of being reduced which do not adversely affect taste.

Suitable amino acid additives include, but are not limited to, aspartic acid, arginine, glycine, glutamic acid, proline, threonine, theanine, cysteine, cystine, alanine, valine, tyrosine, leucine, arabinose, trans-4-hydroxyproline, isoleucine, asparagine, serine, lysine, histidine, ornithine, methionine, carnitine, aminobutyric acid ($\alpha$-, $\beta$-, and/or $\delta$-isomers), glutamine, hydroxyproline, taurine, norvaline, sarcosine, and their salt forms such as sodium or potassium salts or acid salts. The amino acid additives also may be in the D- or L-configuration and in the mono-, di-, or tri-form of the same or different amino acids. Additionally, the amino acids may be $\alpha$-, $\beta$-, $\gamma$- and/or $\delta$-isomers if appropriate. Combinations of the foregoing amino acids and their corresponding salts (e.g., sodium, potassium, calcium, magnesium salts or other alkali or alkaline earth metal salts thereof, or acid salts) also are suitable additives in some embodiments. The amino acids may be natural or synthetic. The amino acids also may be modified. Modified amino acids refers to any amino acid wherein at least one atom has been added, removed, substituted, or combinations thereof (e.g., N-alkyl amino acid, N-acyl amino acid, or N-methyl amino acid). Non-limiting examples of modified amino acids include amino acid derivatives such as trimethyl glycine, N-methyl-glycine, and N-methyl-alanine. As used herein, modified amino acids encompass both modified and unmodified amino acids. As used herein, amino acids also encompass both peptides and polypeptides (e.g., dipeptides, tripeptides, tetrapeptides, and pentapeptides) such as glutathione and L-alanyl-L-glutamine. Suitable polyamino acid additives include poly-L-aspartic acid, poly-L-lysine (e.g., poly-L-α-lysine or poly-L-ε-lysine), poly-L-ornithine (e.g., poly-L-α-ornithine or poly-L-ε-ornithine), poly-L-arginine, other polymeric forms of amino acids, and salt forms thereof (e.g., calcium, potassium, sodium, or magnesium salts such as L-glutamic acid mono sodium salt). The poly-amino acid additives also may be in the D- or L-configuration. Additionally, the poly-amino acids may be α-, β-, γ-, δ-, and ε-isomers if appropriate. Combinations of the foregoing poly-amino acids and their corresponding salts (e.g., sodium, potassium, calcium, magnesium salts or other alkali or alkaline earth metal salts thereof or acid salts) also are suitable additives in some embodiments. The poly-amino acids described herein also may comprise co-polymers of different amino acids. The poly-amino acids may be natural or synthetic. The poly-amino acids also may be modified, such that at least one atom has been added, removed, substituted, or combinations thereof (e.g., N-alkyl poly-amino acid or N-acyl poly-amino acid). As used herein, poly-amino acids encompass both modified and unmodified poly-amino acids. For example, modified poly-amino acids include, but are not limited to, poly-amino acids of various molecular weights (MW), such as poly-L-α-lysine with a MW of 1,500, MW of 6,000, MW of 25,200, MW of 63,000, MW of 83,000, or MW of 300,000.

Suitable sugar acid additives include, but are not limited to, aldonic, uronic, aldaric, alginic, gluconic, glucuronic, glucaric, galactaric, galacturonic, and salts thereof (e.g., sodium, potassium, calcium, magnesium salts or other physiologically acceptable salts), and combinations thereof.

Suitable nucleotide additives include, but are not limited to, inosine monophosphate ("IMP"), guanosine monophosphate ("GMP"), adenosine monophosphate ("AMP"), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, alkali or alkaline earth metal salts thereof, and combinations thereof. The nucleotides described herein also may comprise nucleotide-related additives, such as nucleosides or nucleic acid bases (e.g., guanine, cytosine, adenine, thymine, uracil).

Suitable organic acid additives include any compound which comprises a —COOH moiety, such as, for example, C2-C30 carboxylic acids, substituted hydroxyl C2-C30 carboxylic acids, butyric acid (ethyl esters), substituted butyric acid (ethyl esters), benzoic acid, substituted benzoic acids (e.g., 2,4-dihydroxybenzoic acid), substituted cinnamic acids, hydroxyacids, substituted hydroxybenzoic acids, anisic acid substituted cyclohexyl carboxylic acids, tannic acid, aconitic acid, lactic acid, tartaric acid, citric acid, isocitric acid, gluconic acid, glucoheptonic acids, adipic acid, hydroxycitric acid, malic acid, fruitaric acid (a blend of malic, fumaric, and tartaric acids), fumaric acid, maleic acid, succinic acid, chlorogenic acid, salicylic acid, creatine, caffeic acid, bile acids, acetic acid, ascorbic acid, alginic acid, erythorbic acid, polyglutamic acid, glucono delta lactone, and their alkali or alkaline earth metal salt derivatives thereof. In addition, the organic acid additives also may be in either the D- or L-configuration.

Suitable organic acid additive salts include, but are not limited to, sodium, calcium, potassium, and magnesium salts of all organic acids, such as salts of citric acid, malic acid, tartaric acid, fumaric acid, lactic acid (e.g., sodium lactate), alginic acid (e.g., sodium alginate), ascorbic acid (e.g., sodium ascorbate), benzoic acid (e.g., sodium benzoate or potassium benzoate), sorbic acid and adipic acid. The examples of the organic acid additives described optionally may be substituted with at least one group chosen from hydrogen, alkyl, alkenyl, alkynyl, halo, haloalkyl, carboxyl, acyl, acyloxy, amino, amido, carboxyl derivatives, alkylamino, dialkylamino, arylamino, alkoxy, aryloxy, nitro, cyano, sulfo, thiol, imine, sulfonyl, sulfenyl, sulfinyl, sulfamyl, carboxalkoxy, carboxamido, phosphonyl, phosphinyl, phosphoryl, phosphino, thioester, thioether, anhydride, oximino, hydrazino, carbamyl, phosphor or phosphonato. In particular embodiments, the organic acid additive is present in the sweetener composition in an amount effective to provide a concentration from about 10 ppm to about 5,000 ppm when present in a consumable, such as, for example, a beverage.

Suitable inorganic acid additives include, but are not limited to, phosphoric acid, phosphorous acid, polyphosphoric acid, hydrochloric acid, sulfuric acid, carbonic acid, sodium dihydrogen phosphate, and alkali or alkaline earth metal salts thereof (e.g., inositol hexaphosphate Mg/Ca).

Suitable bitter compound additives include, but are not limited to, caffeine, quinine, urea, bitter orange oil, naringin, quassia, and salts thereof.

Suitable flavorants and flavoring ingredient additives include, but are not limited to, vanillin, vanilla extract, mango extract, cinnamon, citrus, coconut, ginger, viridiflorol, almond, menthol (including menthol without mint), grape skin extract, and grape seed extract. "Flavorant" and "flavoring ingredient" are synonymous and can include natural or synthetic substances or combinations thereof. Flavorants also include any other substance which imparts flavor and may include natural or non-natural (synthetic) substances which are safe for human or animals when used in a generally accepted range. Non-limiting examples of proprietary flavorants include Döhler™ Natural Flavoring Sweetness Enhancer K14323 (Döhler™, Darmstadt, Germany), Symrise™ Natural Flavor Mask for Sweeteners 161453 and 164126 (Symrise™, Holzminden, Germany), Natural Advantage™ Bitterness Blockers 1, 2, 9 and 10 (Natural Advantage™, Freehold, N.J., U.S.A.), and Sucramask™ (Creative Research Management, Stockton, Calif., U.S.A.).

Suitable polymer additives include, but are not limited to, chitosan, pectin, pectic, pectinic, polyuronic, polygalacturonic acid, starch, food hydrocolloid or crude extracts thereof (e.g., gum acacia senegal (Fibergum™), gum acacia seyal, carageenan), poly-L-lysine (e.g., poly-L-α-lysine or poly-L-ε-lysine), poly-L-ornithine (e.g., poly-L-α-ornithine or poly-L-ε-ornithine), polypropylene glycol, polyethylene glycol, poly(ethylene glycol methyl ether), polyarginine, polyaspartic acid, polyglutamic acid, polyethylene imine, alginic acid, sodium alginate, propylene glycol alginate, and sodium polyethyleneglycolalginate, sodium hexametaphosphate and its salts, and other cationic polymers and anionic polymers.

Suitable protein or protein hydrolysate additives include, but are not limited to, bovine serum albumin (BSA), whey protein (including fractions or concentrates thereof such as 90% instant whey protein isolate, 34% whey protein, 50% hydrolyzed whey protein, and 80% whey protein concentrate), soluble rice protein, soy protein, protein isolates, protein hydrolysates, reaction products of protein hydrolysates, glycoproteins, and/or proteoglycans containing amino acids (e.g., glycine, alanine, serine, threonine, asparagine, glutamine, arginine, valine, isoleucine, leucine, norvaline, methionine, proline, tyrosine, hydroxyproline, and the like), collagen (e.g., gelatin), partially hydrolyzed collagen (e.g., hydrolyzed fish collagen), and collagen hydrolysates (e.g., porcine collagen hydrolysate).

Suitable surfactant additives include, but are not limited to, polysorbates (e.g., polyoxyethylene sorbitan monooleate (polysorbate 80), polysorbate 20, polysorbate 60), sodium dodecylbenzenesulfonate, dioctyl sulfosuccinate or dioctyl sulfosuccinate sodium, sodium dodecyl sulfate, cetylpyridinium chloride (hexadecylpyridinium chloride), hexadecyltrimethylammonium bromide, sodium cholate, carbamoyl, choline chloride, sodium glycocholate, sodium taurodeoxycholate, lauric arginate, sodium stearoyl lactylate, sodium taurocholate, lecithins, sucrose oleate esters, sucrose stearate esters, sucrose palmitate esters, sucrose laurate esters, and other emulsifiers, and the like.

Suitable flavonoid additives are classified as flavonols, flavones, flavanones, flavan-3-ols, isoflavones, or anthocyanidins. Non-limiting examples of flavonoid additives include, but are not limited to, catechins (e.g., green tea extracts such as Polyphenon™ 60, Polyphenon™ 30, and Polyphenon™ 25 (Mitsui Norin Co., Ltd., Japan), polyphenols, rutins (e.g., enzyme modified rutin Sanmelin™ AO (San-fi Gen F.F.I., Inc., Osaka, Japan)), neohesperidin, naringin, neohesperidin dihydrochalcone, and the like.

Suitable alcohol additives include, but are not limited to, ethanol. In particular embodiments, the alcohol additive is present in the consumable in a concentration from about 625 ppm to about 10,000 ppm.

Suitable astringent compound additives include, but are not limited to, tannic acid, europium chloride (EuCl$_3$), gadolinium chloride (GdCl$_3$), terbium chloride (TbCl$_3$), alum, tannic acid, and polyphenols (e.g., tea polyphenols). The astringent additive is present in the sweetened composition in a concentration from about 10 ppm to about 5,000 ppm.

In certain embodiments, the beverage has the same sweetness as a beverage sweetened with at least about 250 ppm of Reb M and more particularly, at least about 250 ppm of at least 75% Reb M (i.e. Reb M having at least 75% purity/comprising at least 75% by weight of a mixture, e.g. a steviol glycoside mixture or *Stevia* extract). The sweetness may be measured in sucrose equivalence units.

In certain embodiments, the beverage has the same sweetness as a beverage sweetened with at least about 400 ppm of Reb M and more particularly, at least about 400 ppm of at least 75% Reb M (i.e. Reb M having at least 75% purity/comprising at least 75% by weight of a mixture, e.g. a steviol glycoside mixture or *Stevia* extract). The sweetness may be measured in sucrose equivalence units.

In one embodiment, the beverage has the same sweetness as a beverage sweetened with about 250 ppm of at least 80% Reb M (i.e. Reb M having at least 80% purity/comprising at least 80% by weight of a mixture, e.g. a steviol glycoside mixture or *Stevia* extract).

In certain embodiments, the beverage has the same sweetness as a beverage sweetened with at least about 290 ppm of Reb M, and more particularly, at least about 290 ppm of at least 80% Reb M.

In certain embodiments, the beverage has the same sweetness as a beverage sweetened with at least about 400 ppm of Reb M, and more particularly, at least about 290 ppm of at least 80% Reb M.

In one embodiment, the beverage has the same sweetness as a beverage sweetened with about 250 ppm of at least 80% Reb M (i.e. Reb M having at least 80% purity/comprising at least 90% by weight of a mixture, e.g. a steviol glycoside mixture or *Stevia* extract).

In certain embodiments, the beverage has the same sweetness as a beverage sweetened with at least about 290 ppm of Reb M, and more particularly, at least about 290 ppm of at least 90% Reb M.

In certain embodiments, the beverage has the same sweetness as a beverage sweetened with at least about 400 ppm of Reb M, and more particularly, at least about 290 ppm of at least 90% Reb M.

In certain embodiments, the beverage comprises a blend of Siamenoside I and at least one other sweetener (e.g., a natural high potency sweetener), wherein total blend concentration is less than about 400 ppm and the beverage has the same sweetness of a beverage sweetened with at least about 250 ppm of Reb M and more particularly, at least about 250 ppm of at least 75% reb M.

In certain embodiments, the beverage comprises a blend of Siamenoside I and at least one other sweetener (e.g., a natural high potency sweetener), wherein total blend concentration is less than about 400 ppm and the beverage has the same sweetness of a beverage sweetened with at least about 400 ppm of Reb M and more particularly, at least about 250 ppm of at least 75% reb M.

In certain embodiments, the beverage comprises a blend of Siamenoside I and at least one other sweetener (e.g., a natural high potency sweetener), wherein total blend concentration is less than about 400 ppm and the beverage has the same sweetness of a beverage sweetened with at least about 250 ppm of Reb M and more particularly, at least about 250 ppm of at least 80% reb M.

In certain embodiments, the beverage comprises a blend of Siamenoside I and at least one other sweetener (e.g., a natural high potency sweetener), wherein total blend concentration is less than about 400 ppm and the beverage has the same sweetness of a beverage sweetened with at least about 400 ppm of Reb M and more particularly, at least about 250 ppm of at least 80% reb M.

In certain embodiments, the beverage comprises a blend of Siamenoside I and at least one other sweetener (e.g., a natural high potency sweetener), wherein total blend concentration is less than about 400 ppm and the beverage has the same sweetness of a beverage sweetened with at least about 250 ppm of Reb M and more particularly, at least about 250 ppm of at least 90% reb M.

In certain embodiments, the beverage comprises a blend of Siamenoside I and at least one other sweetener (e.g., a natural high potency sweetener), wherein the total blend concentration is less than about 400 ppm and the beverage has the same sweetness of a beverage sweetened with at least about 400 ppm of Reb M and more particularly, at least about 250 ppm of at least 90% reb M.

In certain embodiments, the beverage comprises a blend of Siamenoside I and at least one other sweetener (e.g., a natural high potency sweetener), wherein the total blend concentration less than about 500 ppm, less than about 475 ppm, less than about 450 ppm, less than about 400 ppm, less than about 380 ppm, less than about 350 ppm or less than about 300 ppm.

In certain embodiments, the beverage comprises a blend of Siamenoside I and at least one other sweetener (e.g., a natural high potency sweetener), wherein the total blend concentration is about 5% less than the concentration of Reb M required to provide a beverage having the same sweetness, and more particularly, about 10% less, about 15% less, about 20% less, about 25% less or about 30% than the concentration of Reb M required to provide a beverage having the same sweetness.

In a particular embodiment, the beverage comprises a blend of Siamenoside I and at least one other sweetener (e.g., a natural high potency sweetener), wherein the total blend concentration is about 5% less than the concentration of Reb M required to provide a beverage having the same sweetness, and more particularly, about 10% less, about 15% less, about 20% less, about 25% less or about 30% than the concentration of at least 75% Reb M (e.g., RebM80, RebM90, RebM95) required to provide a beverage having the same sweetness.

In certain embodiments, the beverage has the same sweetness as a beverage sweetened with at least about 250 ppm of RebA and more particularly, at least about 250 ppm of at least 75% Reb A (i.e. Reb M having at least 75% purity/comprising at least 75% by weight of a mixture, e.g. a steviol glycoside mixture or *Stevia* extract). The sweetness may be measured in sucrose equivalence units.

In certain embodiments, the beverage has the same sweetness as a beverage sweetened with at least about 400 ppm of Reb A and more particularly, at least about 400 ppm of at least 75% Reb A (i.e. Reb A having at least 75% purity/comprising at least 75% by weight of a mixture, e.g. a steviol glycoside mixture or *Stevia* extract). The sweetness may be measured in sucrose equivalence units.

In one embodiment, the beverage has the same sweetness as a beverage sweetened with about 250 ppm of at least 80% Reb A (i.e. Reb M having at least 80% purity/comprising at least 80% by weight of a mixture, e.g. a steviol glycoside mixture or *Stevia* extract).

In one embodiment, the beverage has the same sweetness as a beverage sweetened with about 400 ppm of at least 80% Reb A (i.e. Reb M having at least 80% purity/comprising at least 80% by weight of a mixture, e.g. a steviol glycoside mixture or *Stevia* extract).

In another embodiment, the beverage has the same sweetness as a beverage sweetened with about 250 ppm of at least 90% Reb A (i.e. Reb M having at least 80% purity/comprising at least 80% by weight of a mixture, e.g. a steviol glycoside mixture or *Stevia* extract).

In another embodiment, the beverage has the same sweetness as a beverage sweetened with about 400 ppm of at least 90% Reb A (i.e. Reb M having at least 80% purity/comprising at least 80% by weight of a mixture, e.g. a steviol glycoside mixture or *Stevia* extract).

In certain embodiments, the beverage comprises a blend of Siamenoside I and at least one other sweetener (e.g., a natural high potency sweetener), wherein the total blend concentration is about 5% less than the concentration of RebA required to provide a beverage having the same sweetness, and more particularly, about 10% less, about 15% less, about 20% less, about 25% less or about 30% than the concentration of RebA required to provide a beverage having the same sweetness.

In a particular embodiment, the beverage comprises a blend of Siamenoside I and at least one other sweetener (e.g., a natural high potency sweetener), wherein the total blend concentration is about 5% less than the concentration of Reb A required to provide a beverage having the same sweetness, and more particularly, about 10% less, about 15% less, about 20% less, about 25% less or about 30% than the concentration of at least 75% Reb A (e.g., RebA80, RebA90, RebA95) required to provide a beverage having the same sweetness.

Methods for Improving Temporal and/or Flavor Profile

A method for imparting a more sugar-like temporal profile, flavor profile, or both to a sweetenable composition comprises combining a sweetenable composition with siamenoside I or the sweetener compositions of the present invention, i.e., sweetener compositions containing siamenoside I.

The method can further include the addition of other sweeteners, additives, functional ingredients and combinations thereof. Any sweetener, additive or functional ingredient detailed herein can be used.

As used herein, the "sugar-like" characteristics include any characteristic similar to that of sucrose and include, but are not limited to, maximal response, flavor profile, temporal profile, adaptation behavior, mouthfeel, concentration/response function, tastant/and flavor/sweet taste interactions, spatial pattern selectivity, and temperature effects.

The flavor profile of a sweetener is a quantitative profile of the relative intensities of all of the taste attributes exhibited. Such profiles often are plotted as histograms or radar plots.

These characteristics are dimensions in which the taste of sucrose is different from the tastes of siamenoside I. Of these, however, the flavor profile and temporal profile are particularly important. In a single tasting of a sweet food or beverage, differences (1) in the attributes that constitute a sweetener's flavor profile and (2) in the rates of sweetness onset and dissipation, which constitute a sweetener's temporal profile, between those observed for sucrose and for siamenoside I can be noted.

Whether or not a characteristic is more sugar-like is determined by an expert sensory panel who taste compositions comprising sugar and compositions comprising siamenoside I, both with and without additives, and provide their impression as to the similarities of the characteristics of the sweetener compositions, both with and without additives, with those comprising sugar. A suitable procedure for determining whether a composition has a more sugar-like taste is described in embodiments described herein below.

In a particular embodiment, a panel of assessors is used to measure the reduction of sweetness linger. Briefly described, a panel of assessors (generally 8 to 12 individuals) is trained to evaluate sweetness perception and measure sweetness at several time points from when the sample is initially taken into the mouth until 3 minutes after it has been expectorated. Using statistical analysis, the results are compared between samples containing additives and samples that do not contain additives. A decrease in score for a time point measured after the sample has cleared the mouth indicates there has been a reduction in sweetness perception.

The panel of assessors may be trained using procedures well known to those of ordinary skill in the art. In a particular embodiment, the panel of assessors may be trained using the Spectrum™ Descriptive Analysis Method (Meilgaard et al, *Sensory Evaluation Techniques*, 3rd edition, Chapter 11). Desirably, the focus of training should be the recognition of and the measure of the basic tastes; specifically, sweet. In order to ensure accuracy and reproducibility of results, each assessor should repeat the measure of the reduction of sweetness linger about three to about five times per sample, taking at least a five minute break between each repetition and/or sample and rinsing well with water to clear the mouth.

Generally, the method of measuring sweetness comprises taking a 10 mL sample into the mouth, holding the sample in the mouth for 5 seconds and gently swirling the sample in the mouth, rating the sweetness intensity perceived at 5 seconds, expectorating the sample (without swallowing following expectorating the sample), rinsing with one mouthful of water (e.g., vigorously moving water in mouth as if with mouth wash) and expectorating the rinse water, rating the sweetness intensity perceived immediately upon expectorating the rinse water, waiting 45 seconds and, while waiting those 45 seconds, identifying the time of maximum perceived sweetness intensity and rating the sweetness intensity at that time (moving the mouth normally and swallowing as needed), rating the sweetness intensity after another 10 seconds, rating the sweetness intensity after another 60 seconds (cumulative 120 seconds after rinse), and rating the sweetness intensity after still another 60 seconds (cumulative 180 seconds after rinse). Between samples take a 5 minute break, rinsing well with water to clear the mouth.

In a particular embodiment, the beverage of the present invention has advantageous taste properties. In one embodiment, the beverage has fewer licorice notes than a beverage sweetened with the same amount of LGH extract or mogroside V.

In a particular embodiment, the beverage has at least about 5% fewer licorice notes than a beverage sweetened with the same amount of LHG extract or mogroside V, or more particularly at least about 10%, at least about 15% or at least about 20% fewer licorice notes.

In another embodiment, the beverage has fewer bitter notes than a beverage sweetened with the same amount of LHG extract or the same amount of mogroside V.

In a particular embodiment, the beverage has at least about 5% fewer bitter notes than a beverage sweetened with the same amount of LHG extract or mogroside V, or more particularly, least about 10%, at least about 15% or at least about 20% fewer bitter notes.

In a further embodiment, the beverage has a better mouthfeel than a beverage sweetened with the same amount of LHG extract or mogroside V.

In a particular embodiment, the mouthfeel of the beverage is improved by at least about 5% compared to the mouthfeel of a beverage sweetened with the same amount of LHG extract or mogroside V, or more particularly, at least about 10%, at least about 15%, or at least about 20% improved mouthfeel.

In a still further embodiment, the beverage has the same sweetness as a beverage sweetened with 290 ppm of at least 80% Reb M.

Edible Gel Mixes and Edible Gel Compositions

In one embodiment, the sweetened composition is an edible gel or edible gel mix. Edible gels are gels that can be eaten. Non-limiting examples of edible gel compositions for use in particular embodiments include gel desserts, puddings, jellies, pastes, trifles, aspics, marshmallows, gummy candies, or the like. Edible gel mixes generally are powdered or granular solids to which a fluid may be added to form an edible gel composition. Non-limiting examples of fluids for use in particular embodiments include water, dairy fluids, dairy analogue fluids, juices, alcohol, alcoholic beverages, and combinations thereof. Non-limiting examples of dairy fluids which may be used in particular embodiments include milk, cultured milk, cream, fluid whey, and mixtures thereof. Non-limiting examples of dairy analogue fluids which may be used in particular embodiments include, for example, soy milk and non-dairy coffee whitener.

Confections

In one embodiment, the sweetened composition is a confection. As referred to herein, "confection" can mean a sweet, a lollie, a confectionery, or similar term. The confection generally contains a base composition component and a sweetener component. According to particular embodiments of the present invention, the confections may be desserts such as yogurt, jellies, drinkable jellies, puddings, Bavarian cream, blancmange, cakes, brownies, mousse and the like, sweetened food products eaten at tea time or following meals; frozen foods; cold confections, e.g. types of ice cream such as ice cream, ice milk, lacto-ice and the like, and ice confections such as sherbets, dessert ices and the like; general confections, e.g., baked confections or steamed confections such as crackers, biscuits, buns with bean-jam filling, halvah, alfajor, and the like; rice cakes and snacks; table top products; general sugar confections such as chewing gum, hard candy, soft candy, mints, nougat candy, jelly beans, fudge, toffee, taffy, Swiss milk tablet, licorice candy, chocolates, gelatin candies, marshmallow, marzipan, divinity, cotton candy, and the like; sauces including fruit flavored sauces, chocolate sauces and the like; edible gels; crémes including butter crémes, flour pastes, whipped cream and the like; jams including strawberry jam, marmalade and the like; and breads including sweet breads and the like or other starch products, and combinations thereof.

Condiment Compositions

In one embodiment, the sweetened composition is a condiment composition. Condiments, as used herein, are compositions used to enhance or improve the flavor of a food or beverage. Non-limiting examples of condiments include ketchup; mustard; barbecue sauce; butter; chili sauce; chutney; cocktail sauce; curry; dips; fish sauce; horseradish; hot sauce; jellies, jams, marmalades, or preserves; mayonnaise; peanut butter; relish; remoulade; salad dressings; salsa; sauerkraut; soy sauce; steak sauce; syrups; tartar sauce; and Worcestershire sauce. Condiment bases generally comprise a mixture of different ingredients, non-limiting examples of which include vehicles (e.g., water and vinegar); spices or seasonings (e.g., salt, pepper, garlic, mustard seed, onion, paprika, turmeric, and combinations thereof); fruits, vegetables, or their products (e.g., tomatoes or tomato-based products (paste, puree), fruit juices, fruit juice peels, and combinations thereof); oils or oil emulsions, particularly vegetable oils; thickeners (e.g., xanthan gum, food starch, other hydrocolloids, and combinations thereof); and emulsifying agents (e.g., egg yolk solids, protein, gum arabic, carob bean gum, guar gum, gum karaya, gum tragacanth, carageenan, pectin, propylene glycol esters of alginic acid, sodium carboxymethyl-cellulose, polysorbates, and combinations thereof). Recipes for condiment bases and methods of making condiment bases are well known to those of ordinary skill in the art.

Chewing Gum Compositions

In one embodiment, the sweetened composition is a chewing gum composition. Chewing gum compositions generally comprise a water-soluble portion and a water-insoluble chewable gum base portion. The water soluble portion dissipates with a portion of the flavoring agent over a period of time during chewing while the insoluble gum base portion is retained in the mouth. The insoluble gum base generally determines whether a gum is considered chewing gum, bubble gum, or a functional gum.

Flavoring agents may be used in either the insoluble gum base or soluble portion of the chewing gum composition. Such flavoring agents may be natural or artificial flavors. In a particular embodiment, the flavoring agent comprises an essential oil, such as an oil derived from a plant or a fruit, peppermint oil, spearmint oil, other mint oils, clove oil, cinnamon oil, oil of wintergreen, bay, thyme, cedar leaf, nutmeg, allspice, sage, mace, and almonds. In another particular embodiment, the flavoring agent comprises a plant extract or a fruit essence such as apple, banana, watermelon, pear, peach, grape, strawberry, raspberry, cherry, plum, pineapple, apricot, and mixtures thereof. In still another particular embodiment, the flavoring agent comprises a citrus flavor, such as an extract, essence, or oil of lemon, lime, orange, tangerine, grapefruit, citron, or kumquat.

Cereal Compositions

In one embodiment, the sweetened composition is a cereal composition. Cereal compositions typically are eaten either as staple foods or as snacks. Non-limiting examples of cereal compositions for use in particular embodiments include ready-to-eat cereals as well as hot cereals. Ready-to-eat cereals are cereals which may be eaten without further processing (i.e. cooking) by the consumer. Examples of ready-to-eat cereals include breakfast cereals and snack bars. Breakfast cereals typically are processed to produce a shredded, flaky, puffy, or extruded form. Breakfast cereals generally are eaten cold and are often mixed with milk and/or fruit. Snack bars include, for example, energy bars, rice cakes, granola bars, and nutritional bars. Hot cereals generally are cooked, usually in either milk or water, before being eaten. Non-limiting examples of hot cereals include grits, porridge, polenta, rice, and rolled oats.

Cereal compositions generally comprise at least one cereal ingredient. As used herein, the term "cereal ingredient" denotes materials such as whole or part grains, whole or part seeds, and whole or part grass. Non-limiting examples of cereal ingredients for use in particular embodiments include maize, wheat, rice, barley, bran, bran endosperm, bulgur, soghums, millets, oats, rye, triticale, buchwheat, fonio, quinoa, bean, soybean, amaranth, teff, spelt, and kaniwa.

Baked Goods

In one embodiment, the sweetened composition is a baked good. "Baked goods," as used herein, include ready to eat and all ready to bake products, flours, and mixes requiring preparation before serving. Non-limiting examples of baked goods include cakes, crackers, cookies, brownies, muffins, rolls, bagels, donuts, strudels, pastries, croissants, biscuits, bread, bread products, and buns.

Baked goods in accordance with particular embodiments of this invention generally comprise a combination of sweetener, water, fat and leavening agent. Baked goods made in accordance with many embodiments of this invention also contain flour in order to make a dough or a batter.

According to particular embodiments of this invention, leavening agents may comprise chemical leavening agents or yeast leavening agents. Non-limiting examples of chemical leavening agents suitable for use in particular embodiments of this invention include baking soda (e.g., sodium, potassium, or aluminum bicarbonate), baking acid (e.g., sodium aluminum phosphate, monocalcium phosphate, or dicalcium phosphate), and combinations thereof.

Dairy Products

In one embodiment, the sweetened composition is a dairy product. Dairy products and processes for making dairy products suitable for use in this invention are well known to those of ordinary skill in the art. Dairy products, as used herein, comprise milk or foodstuffs produced from milk. Non-limiting examples of dairy products suitable for use in embodiments of this invention include milk, milk cream, sour cream, créme fraiche, buttermilk, cultured buttermilk, milk powder, condensed milk, evaporated milk, butter, cheese, cottage cheese, cream cheese, yogurt, ice cream, frozen custard, frozen yogurt, gelato, vla, piima, filmjolk, kajmak, kephir, viili, kumiss, airag, ice milk, casein, ayran, lassi, khoa, or combinations thereof. The dairy products can be produced through conventional means or can be filtered or further modified to adjust the taste properties. In certain embodiments, the dairy products can be liquid dairy products from which one or more of the carbohydrate sugars (lactose or its breakdown products galactose or glucose) are reduced as compared to milk prior to such processing, or are substantially removed and which are supplemented with the sweetening composition described herein. The reduction of carbohydrates can be about 5% or about 10% or about 20% or about 50% or about 70% or more as compared to unprocessed milk.

According to particular embodiments of this invention, the dairy compositions also may comprise other additives. Non-limiting examples of suitable additives include sweeteners and flavorants such as chocolate, strawberry, and banana. Particular embodiments of the dairy compositions provided herein also may comprise additional nutritional supplements such as vitamins (e.g., vitamin D) and minerals (e.g., calcium) to improve the nutritional composition of the milk.

Tabletop Sweetener Compositions

In one embodiment, the sweetened composition is a tabletop sweetener. The tabletop sweetener can further include at least one bulking agent, additive, anti-caking agent, functional ingredient or combination thereof.

Suitable "bulking agents" include, but are not limited to, maltodextrin (10 DE, 18 DE, or 5 DE), corn syrup solids (20 or 36 DE), sucrose, fructose, glucose, invert sugar, sorbitol, xylose, ribulose, mannose, xylitol, mannitol, galactitol, erythritol, maltitol, lactitol, isomalt, maltose, tagatose, lactose, inulin, glycerol, propylene glycol, polyols, polydextrose, fructooligosaccharides, cellulose and cellulose derivatives, and the like, and mixtures thereof. Additionally, in accordance with still other embodiments of the invention, granulated sugar (sucrose) or other caloric sweeteners such as crystalline fructose, other carbohydrates, or sugar alcohol can be used as a bulking agent due to their provision of good content uniformity without the addition of significant calories.

As used herein, the phrase "anti-caking agent" and "flow agent" refer to any composition which assists in content uniformity and uniform dissolution. In accordance with particular embodiments, non-limiting examples of anti-caking agents include cream of tartar, calcium silicate, silicon dioxide, microcrystalline cellulose (Avicel, FMC BioPolymer, Philadelphia, Pa.), and tricalcium phosphate. In one embodiment, the anti-caking agents are present in the tabletop sweetener composition in an amount from about 0.001 to about 3% by weight of the tabletop sweetener composition.

The tabletop sweetener compositions can be packaged in any form known in the art. Non-limiting forms include, but are not limited to, powder form, granular form, packets, tablets, sachets, pellets, cubes, solids, and liquids.

In one embodiment, the tabletop sweetener composition is a single-serving (portion control) packet comprising a dry-blend. Dry-blend formulations generally may comprise powder or granules. Although the tabletop sweetener composition may be in a packet of any size, an illustrative non-limiting example of conventional portion control tabletop sweetener packets are approximately 2.5 by 1.5 inches and hold approximately 1 gram of a sweetener composition having a sweetness equivalent to 2 teaspoons of granulated sugar (~8 g). In a particular embodiment, a dry-blend tabletop sweetener formulation may contain a sweetener an amount from about 1% (w/w) to about 10% (w/w).

A tabletop sweetener composition also may be embodied in the form of a liquid, wherein a composition of the present invention is combined with a liquid carrier. Suitable non-limiting examples of carrier agents for liquid tabletop sweeteners include water, alcohol, polyol, glycerin base or citric acid base dissolved in water, and mixtures thereof. The sweetness equivalent of a tabletop sweetener composition for any of the forms described herein or known in the art may be varied to obtain a desired sweetness profile. For example, a tabletop sweetener composition may comprise a sweetness comparable to that of an equivalent amount of standard sugar. In another embodiment, the tabletop sweetener composition may comprise a sweetness of up to 100 times that of an equivalent amount of sugar. In another embodiment, the tabletop sweetener composition may comprise a sweetness of up to 90 times, 80 times, 70 times, 60 times, 50 times, 40 times, 30 times, 20 times, 10 times, 9 times, 8 times, 7 times, 6 times, 5 times, 4 times, 3 times, and 2 times that of an equivalent amount of sugar.

Delivery Systems

Siamenoside I and sweetener compositions comprising siamenoside I can also be formulated into various delivery systems having improved ease of handling and rate of dissolution. Non-limiting examples of suitable delivery systems comprise sweetener compositions co-crystallized with a sugar or a polyol, agglomerated sweetener compositions, compacted sweetener compositions, dried sweetener compositions, particle sweetener compositions, spheronized sweetener compositions, granular sweetener compositions, and liquid sweetener compositions.

EXAMPLES

Example 1: Sensory Evaluation of Beverages Containing Siamenoside I

Sensory evaluations of siamenoside I were completed in various beverages, as detailed herein.

Mock Beverage:

Siamenoside I was separately tasted in citric acid buffer (pH 3.2) and phosphoric acid buffer (pH 2.6) at 500 ppm and compared against an equivalent solution of RebM90 (RebM with at least 90% purity) and various other sweeteners.

RebM90 solution was the sweetest and mogroside V solution was the least sweet. 500 ppm of mogroside V had a Brix SE of approximately 7. Accordingly, the dosage of all other sweeteners was adjusted benchmark 500 ppm mogroside V. Estimated concentrations are presented below.

| Sweetener | Dosage for ~7 Brix SE |
|---|---|
| Mogroside IV | 435 ppm |
| Rebaudioside N | 360 ppm |
| Mogroside V | 500 ppm |
| Mogroside IIIe | 350 ppm |
| Siamenoside I | 350 ppm |
| Isomogroside V | 270 ppm |
| RebM90 | 250 ppm |

Beverage Matrices

A blind evaluation of the above-named sweeteners was conducted in six (6) beverage (liquid) matrices, including both sparkling and still matrixes. Of the six beverage matrices, four (4) were calorie reduction matrixes and two (2) were diet matrixes. RebM90 served as control. 7-10 internal team members blindly evaluated the samples. The results are provided below.

| Beverage Matrixes | Target Brix Level | Sucrose Equivalence (SE) from Novel compounds |
|---|---|---|
| Lemon Lime Sparkling (70% sugar reduction) | 10 | 7 |
| Orange Sparkling (65% sugar reduction) | 11.3 | 7 |
| Cola Type of beverage | 10 | 7 |
| Black Tea Lemon (Diet) | 7 | 7 |
| Water Plus (Diet) | 7 | 7 |
| Orange Juice | 12.5 | 7 |

Bench Evaluation Results:

| Beverage Matrixes | Best Performing Sweetener* | Comments |
|---|---|---|
| Lemon Lime Sparkling (70% sugar reduction) | Rebaudioside N, Mogroside IV and siamenoside I | Isomogroside V significantly less sweet (−1.5BE), mogroside IV slightly bitter. |
| Orange Sparkling (65% sugar reduction) | Rebaudioside N and siamenoside I | Overall performs better in this matrix. Covers most of the off note. |
| Cola type of beverage | Rebaudioside N, Mogroside V and siamenoside I | Overall performance good. One tester (highly sensitive) mogroside V had some monk fruit note. Other sweetener seems less sweet than control (−0.3-0.6 SE) |
| Black Tea Lemon (Diet) | Rebaudioside N | Overall performance in the matrix is low. Less sweet, exhibiting bitter or off note. |
| Water Plus (Diet) | Rebaudioside N and siamenoside I | Better than in tea. The monk fruit type sweeteners has noticeable flavor off note. |
| Orange Juice (5.3 Brix from juice) | Rebaudioside N and siamenoside I | Overall performance is better. rebaudioside N performs closest to RebM90. Other sweetener seems less sweet than control (−0.3-1BE) |

*If sensory result close to the matrixes with RebM90 in terms of sweet intensity and profile, the sweetener will be considered as best performing.
Siamenoside I performs consistently well in all the matrixes evaluated.

Example 2: Sensory Evaluation of Beverages Containing a Blend of Siamenoside I and RebM90

Siamenoside I in citric acid buffer matrix (pH3.2) at 220 ppm was blended with RebM90 at 160 ppm and compared with 470 ppm RebM90 alone in citric acid buffer matrix. The sweetness intensity of both solutions was very similar. Specifically, the blend delivered a 10% sucrose equivalence (SE). Importantly, the total blend concentration was 380 ppm, which is 90 ppm (~20%) less than RebM90 alone.

Sensory evaluation from the panel indicated that the taste quality of the beverage with blend was improved, including significantly less bitter and less sweetness linger.

Example 3: Sensory Evaluation of Beverages Containing a Blend of Siamenoside I and RebM95

Mock Beverage

Acidified mock beverages (100 grams) were made using the following ingredients (in grams) in order:

a) Acidified Mock Beverages with Reb-M

| Ingredients | Bev. #1 Reb-M 480 ppm | Bev. #2 Reb-M 360 ppm + Siamenoside I 120 ppm | Bev. #3 Reb-M 240 ppm + Siamenoside I 240 ppm | Bev. #4 Reb-M 120 ppm + Siamenoside I 360 ppm | Bev. #5 Siamenoside I 480 ppm |
|---|---|---|---|---|---|
| Water | 99.81 | 99.81 | 99.81 | 99.81 | 99.81 |
| Citric acid | 0.117 | 0.117 | 0.117 | 0.117 | 0.117 |
| Sodium citrate | 0.027 | 0.027 | 0.027 | 0.027 | 0.027 |
| Reb-M | 0.048 | 0.036 | 0.024 | 0.012 | — |
| CC-00351 | — | 0.012 | 0.024 | 0.036 | 0.048 |
| Total | 100 g | 100 g | 100 g | 100 g | 100 | b) Acidified Mock Beverages with A95 (a *Stevia* Blend of Rebaudioside D and M)

| Ingredients | Bev. #6 A95 480 ppm | Bev. #7 A95 360 ppm + Siamenoside I 120 ppm | Bev. #8 A95 240 ppm + Siamenoside I 240 ppm | Bev. #9 A95 120 ppm + Siamenoside I 360 ppm |
|---|---|---|---|---|
| Water | 99.81 | 99.81 | 99.81 | 99.81 |
| Citric acid | 0.117 | 0.117 | 0.117 | 0.117 |
| Sodium citrate | 0.027 | 0.027 | 0.027 | 0.027 |
| A95 | 0.048 | 0.036 | 0.024 | 0.012 |
| CC-00351 | — | 0.012 | 0.024 | 0.036 |
| Total | 100 g | 100 g | 100 g | 100 g | c) Acidified Mock Beverages with A95 and Reb-M

| Ingredients | Bev. #10 Reb-M 480 ppm | Bev. #11 A95 120 ppm + Siamenoside I 360 ppm | Bev. #12 Reb-M 120 ppm + Siamenoside I 360 ppm | Bev. #13 A95 480 ppm |
|---|---|---|---|---|
| Water | 99.81 | 99.81 | 99.81 | 99.81 |
| Citric acid | 0.117 | 0.117 | 0.117 | 0.117 |
| Sodium citrate | 0.027 | 0.027 | 0.027 | 0.027 |
| A95 | — | 0.012 | — | 0.048 |
| CC-00351 | — | 0.036 | 0.036 | — |
| Reb-M | 0.048 | — | 0.012 | — |
| Total | 100 g | 100 g | 100 g | 100 g |

Sensory Tasting and Results

Four experienced panelists bench tasted the beverages blindly. Each panelist was given warm bottled water and unsalted crackers to eat and rinse the palate between samples. A maximum of 3 samples was tasted at each session to avoid fatigue.

Mock Beverages a) Mock Beverages with Reb-M

The first session consisted of tasting beverages with Reb-M and the details are shown in table below. The results show that the blend of Reb-M at 120 ppm and CC-00351 (Siamenoside I) at 360 ppm was the cleanest and sweetest while CC-00351 was the least sweet and most sour.

| Beverage | Panelists Preference Score (1 = most preferred 5 = least preferred) | Panelist Comments |
|---|---|---|
| Bev. #1 Reb-M 480 ppm) | 2 | Clean taste, some sweetness lingering, fast sweetness onset |
| Bev. #2 Reb-M 360 ppm + Siamenoside I 120 ppm | 3 | Sour, less sweet |
| Bev. #3 Reb-M 240 ppm + Siamenoside I 240 ppm | 4 | Slow sweetness onset |
| Bev. #4 Reb-M 120 ppm + Siamenoside I 360 ppm | 1 | Very clean taste, fast sweetness onset |
| Bev. #5 Siamenoside I 480 ppm | 5 | Least sweet, sour | b) Mock Beverages with A95

The second session consisted of tasting the beverages with A95 and the results are shown below. All panelists agreed that the blend consisting of A95 (120 ppm) plus Siamenoside I (360 ppm) tasted the best, followed by A95 alone. The blend with A95 (240 ppm) and Siamenoside I (240 ppm) was the least sweet and most sour.

| Beverage | Panelists Preference Score (1 = most preferred 5 = least preferred) | Panelist Comments |
|---|---|---|
| Bev. #1 Reb-M 480 ppm) | 2 | Clean taste, some sweetness lingering, fast sweetness onset |
| Bev. #2 Reb-M 360 ppm + Siamenoside I 120 ppm | 3 | Sour, less sweet |
| Bev. #3 Reb-M 240 ppm + Siamenoside I 240 ppm | 4 | Slow sweetness onset |
| Bev. #4 Reb-M 120 ppm + Siamenoside I 360 ppm | 1 | Very clean taste, fast sweetness onset |
| Bev. #5 Siamenoside I 480 ppm | 5 | Least sweet, sour |

| Beverage | Panelists Preference Score (1 = most preferred 4 = least preferred) | Panelist Comments |
|---|---|---|
| Bev. #6 A95 480 ppm | 2 | Clean taste, more rounded |
| Bev. #7 A95 360 ppm + Siamenoside I 120 ppm | 3 | Slightly bitter aftertaste |
| Bev. #8 A95 ppm 240 ppm + Siamenoside I 240 ppm | 4 | Less sweet, most sour |
| Bev. #9 A95 120 ppm + Siamenoside I 360 ppm | 1 | Nice sweetness profile, clean | c) Mock Beverages with A95 and Reb-M

The third session consisted of evaluating two blends of similar ratios of Reb-M+Siamenoside I vs. A95+Siamenoside I and using the Reb-M alone and A95 alone as controls. The results on table below show that the blend Reb-M+Siamenoside I was the most preferred by panelists due to its clean and rounded taste. The blend A95+ Siamenoside I was the least preferred because it was found most sour and least sweet.

| Beverage | Panelists Preference Score (1 = most preferred 4 = least preferred) | Panelist Comments |
|---|---|---|
| Bev. #10 Reb-M 480 ppm | 2 | More rounded sweetness profile |
| Bev. #11 A95 120 ppm + Siamenoside I 360 ppm | 4 | Least sweet, most sour |
| Bev. #12 Reb-M 120 ppm + Siamenoside I 360 ppm | 1 | More rounded sweetness profile, clean taste |
| Bev. #13 A95 480 ppm | 3 | Slightly less sweet than Reb-M but rounded |

Siamenoside I performs well in blend with Reb-M at a ratio of 1:3.

Sensory Evaluation in Carbonated Beverages a) Lemon-Lime Flavored Carbonated Beverage The following table shows the ingredients and their amount in the finished beverage

| Ingredients | Bev. #1 Reb-M 480 ppm | Bev. #2 Reb-M 360 ppm + Siamenoside I 120 ppm | Bev. #3 Reb-M 240 ppm + Siamenoside I 240 ppm | Bev. #4 Reb-M 120 ppm + Siamenoside I 360 ppm | Bev. #5 Siamenoside I 480 ppm |
|---|---|---|---|---|---|
| Filtered water | 99.7 | 99.7 | 99.7 | 99.7 | 99.7 |
| Citric acid | 0.117 | 0.117 | 0.117 | 0.117 | 0.117 |
| Sodium citrate | 0.027 | 0.027 | 0.027 | 0.027 | 0.027 |
| Sodium benzoate | 0.018 | 0.018 | 0.018 | 0.018 | 0.018 |
| Lemon lime flavor | 0.087 | 0.087 | 0.087 | 0.087 | 0.087 |
| Reb-M | 0.048 | 0.036 | 0.024 | 0.012 | — |
| CC-00351 | — | 0.012 | 0.024 | 0.036 | 0.048 |
| TOTAL | 100 | 100 | 100 | 100 | 100 |

The ingredients were dissolved in filtered water to constitute a syrup (6.5 times concentrated), then the final beverage was made by weighing the appropriate syrup amount and adding carbonated water using a ratio of 1 part syrup+5.5 parts carbonated water. Target carbonation volume in finished beverages was 3.8% of $CO_2$. For samples with high Reb-M content (#1 and #2) syrup water was heated to about 47° C. to allow Reb-M solubility, then cooled down to ambient temperature before adding the remaining ingredients. Final beverages were filled in 300 ml glass bottles then aged for 3 days at 35° C. before they were cooled and served cold (4° C.).

Four experienced panelists bench tasted the beverages blindly. Each panelist was given warm bottled water and unsalted crackers to eat and rinse the palate between samples. A maximum of 3 samples was tasted at each session to avoid fatigue.

Results from the table below show that Reb-M alone and the blend of Reb-M at 360 ppm and Siamenoside I at 120 ppm were equally preferred by panelists (score of 1.8) with much cleaner taste profile. Siamenoside I alone was the least preferred with more sweetness lingering, reduced sweetness and metallic aftertaste.

| Beverage | Panelists Preference Score Average (1 = most preferred 5 = least preferred) | Panelist Comments |
|---|---|---|
| Bev. #1 Reb-M 480 ppm | 1.8 | Clean, almost sugar-like |
| Bev. #2 Reb-M 360 ppm + Siamenoside 1120 ppm | 1.8 | More lemon lime flavor, clean, less sweetness lingering |
| Bev. #3 Reb-M 240 ppm + Siamenoside I 240 ppm | 3.8 | Metallic, more sweetness lingering |
| Bev. #4 Reb-M 120 ppm + Siamenoside I 360 ppm | 3.2 | More sourness, slightly bitter |
| Bev. #5 Siamenoside I 480 ppm | 4.4 | Least sweet, most sweetness lingering, metallic and bitter aftertaste |

Siamenoside I performed better in blends with Reb-M and could achieve a maximum sweetness intensity of 10 Brix equivalent b) Cola Flavored Carbonated Beverage The following table shows the ingredients and their amount in the finished beverage

| Ingredients | Bev. #1 Reb-M 480 ppm | Bev. #2 Reb-M 360 ppm + Siamenoside I 120 ppm | Bev. #3 Reb-M 240 ppm + Siamenoside I 240 ppm | Bev. #4 Reb-M 120 ppm + Siamenoside I 360 ppm | Bev. #5 Siamenoside I 480 ppm |
|---|---|---|---|---|---|
| Filtered water | 99.69 | 99.69 | 99.69 | 99.69 | 99.69 |
| Caramel | 0.17 | 0.17 | 0.17 | 0.17 | 0.17 |
| Phosphoric acid | 0.02 | 0.02 | 0.02 | 0.02 | 0.02 |
| Citric acid | 0.01 | 0.01 | 0.01 | 0.01 | 0.01 |
| Potassium sorbate | 0.011 | 0.011 | 0.011 | 0.011 | 0.011 |
| Sodium benzoate | 0.009 | 0.009 | 0.009 | 0.009 | 0.009 |
| Caffeine | 0.008 | 0.008 | 0.008 | 0.008 | 0.008 |
| Cola flavor | 0.03 | 0.03 | 0.03 | 0.03 | 0.03 |
| Reb-M | 0.048 | 0.036 | 0.024 | 0.012 | — |
| CC-00351 | — | 0.012 | 0.024 | 0.036 | 0.048 |
| TOTAL | 100 | 100 | 100 | 100 | 100 |

The ingredients were dissolved in filtered water to constitute a syrup (6.5 times concentrated), then the final beverage was made by weighing the appropriate syrup amount and adding carbonated water using a ratio of 1 part syrup+5.5 parts carbonated water. Target carbonation volume in finished beverages was 3.8% of $CO_2$. For samples with high Reb-M content (#1 and #2) syrup water was heated to about 47° C. to allow Reb-M solubility, then cooled down to ambient temperature before adding the remaining ingredients. Final beverages were filled in 300 ml glass bottles then aged for 3 days at 35° C. before they were cooled and served cold (4° C.).

Four experienced panelists bench tasted the beverages blindly. Each panelist was given warm bottled water and unsalted crackers to eat and rinse the palate between samples. A maximum of 3 samples was tasted at each session to avoid fatigue.

Results from the table below show that Reb-M alone and the blend of Reb-M at 360 ppm and Siamenoside I at 120 ppm were equally preferred by panelists (score of 2.4) with much cleaner taste profile. Siamenoside I alone was the least preferred with metallic notes, bitter aftertaste and reduced sweetness.

| Beverage | Panelists Preference Score Average (1 = most preferred 5 = least preferred) | Panelist Comments |
|---|---|---|
| Bev. #1 Reb-M 480 ppm | 2.4 | Good mouthfeel, clean finish |
| Bev. #2 Reb-M 360 ppm + Siamenoside I 120 ppm | 2.4 | No sweetness lingering, good mouthfeel |
| Bev. #3 Reb-M 240 ppm + Siamenoside I 240 ppm | 2.8 | Metallic, some bitter aftertaste |
| Bev. #4 Reb-M 120 ppm + Siamenoside I 360 ppm | 2.8 | Metallic, some medicinal notes |
| Bev. #5 Siamenoside I 480 ppm | 4.6 | Metallic, bitter, not sweet |

Both flavored carbonated beverages (lemon lime and cola) showed a good performance of the blend with Siamenoside I and Reb-M comparable to Reb-M alone. Siamenoside I in blend with Reb-M showed a good potential in beverage application with room for improvements using different tools available Example 4: Sensory Evaluation of Beverages Containing a Blend of Siamenoside I and RebA95

Siamenoside I in citric acid buffer (pH3.2) at 30 ppm was blended with 470 ppm of RebM95s and compared with 600 ppm of RebA alone in citric acid buffer. The sweetness intensity of both solution is very similar. Specifically, the blend delivered an 8% sucrose equivalence (SE), Importantly, the total blend concentration is 500 ppm, which is 100 ppm (~16%) less than RebM95 alone.

Sensory evaluation from the panel indicated that the taste quality of the beverage with blend had improved, including less sweetness linger and significantly less bitterness as compare to RebA95 alone.

Example 5: Sensory Evaluation of Siamenoside I in Cola Beverage Application

Siamenoside I in a Cola type of sparking beverage at 600 ppm was compared with 470 ppm of RebM90 in the same matrix, providing the same 10% sucrose equivalence (SE) and a similar taste profile with reduced bitterness, sweetness linger and cleaner finish.

Example 6: Sensory Evaluation of Siamenoside I in Lemon/Lime Beverage Application Siamenoside in Lemon/Lime sparking beverage at 600 ppm was compared with 470 ppm of RebM90 in the same matrix, providing the same 10% SE and taste profile.

The invention claimed is:

1. A zero-calorie, non-carbonated beverage comprising (i) a liquid matrix comprising citric acid, (ii) siamenoside I that is at least about 80% pure in an amount from about 300 ppm to about 400 ppm, and (iii) rebaudioside M that is at least about 90% pure, wherein the ratio of siamenoside I to rebaudioside M is about 3:1 and the beverage does not comprise a rare sugar.

2. The beverage of claim 1, wherein the beverage does not contain a mogroside other than siamenoside I.

3. The beverage of claim 1, wherein the beverage further comprises glycosylated steviol glycosides.

4. The beverage of claim 1, wherein the beverage further comprises one or more sugar alcohols.

5. The beverage of claim 4, wherein the one or more sugar alcohols is selected from erythritol, sorbitol and mannitol.

6. The beverage of claim 1, wherein the siamenoside I is present in an amount effective to provide a sweetness equivalence of at least about 5 degrees Brix of sucrose.

7. The beverage of claim 1, wherein the beverage has a sweetness intensity equivalent to 10 Brix.

8. The beverage of claim 1, further comprising one or more organic acid additive selected from the group consisting of a C2-C30 carboxylic acid, substituted hydroxyl C2-C30 carboxylic acid, benzoic acid, substituted benzoic acid, substituted cinnamic acid, hydroxyacid, substituted hydroxybenzoic acid, anisic acid substituted cyclohexyl carboxylic acid, tannic acid, aconitic acid, lactic acid, tartaric acid, isocitric acid, gluconic acid, glucoheptanoic acid, adipic acid, hydroxycitric acid, malic acid, fruitaric acid, fumaric acid, maleic acid, succinic acid, chlorogenic acid, salicylic acid, creatine, caffeic acid, bile acid, acetic acid, ascorbic acid, alginic acid, erythorbic acid, polyglutamic acid, gluocono delta lactone, and alkali or alkaline earth metal salts thereof.

9. The beverage of claim 1, further comprising one or more organic acid additive selected from the group consisting of a sodium, calcium, potassium or magnesium salt of citric acid, malic acid, tartaric acid, fumaric acid, lactic acid, alginic acid, ascorbic acid, benzoic acid, sorbic acid and adipic acid.

10. The beverage of claim 9, wherein the one or more organic acid additive is present in an amount from about 10 ppm to about 5,000 ppm.

11. The beverage of claim 1, wherein the non-carbonated beverage is selected from the group consisting of a fruit juice, fruit-flavored juice, juice drink, nectar, vegetable juice, vegetable-flavored juice, sports drink, energy drink, enhanced water drink, near water drink, coconut water, tea type drink, coffee, cocoa drink, beverage containing milk components, beverage containing cereal extracts, and smoothie.

* * * * *